United States Patent
Huynh

(10) Patent No.: US 7,184,753 B2
(45) Date of Patent: Feb. 27, 2007

(54) MAILBOX POOLING PRE-EMPTING CRITERIA

(75) Inventor: Truyen Huynh, Kitchener (CA)

(73) Assignee: Research In Motion Limited, Waterloo (CA)

( * ) Notice: Subject to any disclaimer, the term of this patent is extended or adjusted under 35 U.S.C. 154(b) by 255 days.

(21) Appl. No.: 10/762,820

(22) Filed: Jan. 22, 2004

(65) Prior Publication Data

US 2005/0164703 A1 Jul. 28, 2005

(51) Int. Cl.
*H04Q 7/22* (2006.01)
(52) U.S. Cl. ............... 455/412.1; 455/412.2; 455/413; 455/414.1; 455/414.2; 455/432.3; 455/466; 709/203; 709/209; 707/1; 707/8; 707/200
(58) Field of Classification Search ............ 455/412.1, 455/412.2, 414.1, 466; 707/1, 8, 10, 200, 707/201, 203; 709/201, 203, 209, 217–219, 709/232

See application file for complete search history.

(56) References Cited

U.S. PATENT DOCUMENTS

| | | | | |
|---|---|---|---|---|
| 5,729,735 | A * | 3/1998 | Meyering | 707/10 |
| 5,864,837 | A * | 1/1999 | Maimone | 707/1 |
| 6,034,621 | A * | 3/2000 | Kaufman | 340/7.21 |
| 6,226,650 | B1 * | 5/2001 | Mahajan et al. | 707/201 |
| 6,282,565 | B1 * | 8/2001 | Shaw et al. | 709/206 |
| 6,654,746 | B1 * | 11/2003 | Wong et al. | 707/10 |
| 2001/0042099 | A1 * | 11/2001 | Peng | 709/206 |
| 2001/0054115 | A1 | 12/2001 | Ferguson et al. | |
| 2002/0026513 | A1 | 2/2002 | Hoglund et al. | |
| 2002/0032018 | A1 | 3/2002 | Morton et al. | |
| 2002/0174372 | A1 * | 11/2002 | Venkataraman | 713/400 |
| 2003/0036380 | A1 | 2/2003 | Skidmore | |
| 2003/0055902 | A1 * | 3/2003 | Amir et al. | 709/206 |
| 2003/0224760 | A1 | 12/2003 | Day | |
| 2005/0030913 | A1 | 2/2005 | Roy | |

FOREIGN PATENT DOCUMENTS

JP 2002-077227 3/2002

OTHER PUBLICATIONS

Crispin, M: RFC 2060: Internet Message Access Protocol, V4rev1, Dec. 1996.*

(Continued)

*Primary Examiner*—Steve M. D'Agosta
(74) *Attorney, Agent, or Firm*—Stephen Perry; Perry + Partners

(57) ABSTRACT

Mailbox pooling pre-emptive criteria is set forth for use in an adaptive polling system for synchronizing data between a mail server and a mobile communication device. The polling engine stores an indication of the number of messages in the mailbox, the total mailbox size (i.e. the used storage size in bytes), and the last message ID from the last poll. In the next poll, the polling engine retrieves this information from the mailbox and checks against the values stored from the last poll. If the information is the same, then there is no need to compare the message ID list. Whenever either the number of messages in the mailbox or the mailbox size or last message ID has changed, then the full comparision of the message ID list is performed.

3 Claims, 4 Drawing Sheets

OTHER PUBLICATIONS

Myers et al: RFC 1939:Post Office Protocol Version 3, Network Working Group Request for Comments, May 1996, XP002197697, paragraph [0005].
Crispin M: RFC 2060:Internet Message Access Protocol Version 4rev1, Network Working Group Request for Comments, Dec. 1996, XP002208010, retrieved from internet: <URL:http://www.ietf.org/rfc/rfc2060.txt>, pargraph [6.3.10].
Ward Foster et al: Method for reducing polling traffic within a mailbox communication system, Research Disclosure, Kenneth Mason Publications, Hampshire, GB, vol. 468, No. 64, Apr. 2003, XP007 132506, ISSN: 0374-4353.
www.novell.com/coolsolutions/netmail/features/a_netmailxe_performance_nm.html.
http://www.washington.edu/imap/listarch/1998/msg00013.htlm.
http://www.teamon.com/serviceproviders/wireless_technology.html.
iMail(http:www.di.co.nz/Frames/Products/Concepts.htm).
http://tiger.coe.missouri.edu/~perfsppt/email.html.
http:www.onlamp.com/pub/a/onlamp/2004/01/09/uucp.html.
http://www.serverwatch.com/news/article.php/1473411.
http://www.esurf.co.nz/email.htm.
http://www.vodafone.net/xam_rc/newlook_20ga/english_web_imgs/help/help.htm.
http://www.air2web.com/solutions_mep.jsp.
Milasinovic, B. et al., "An E-mail connectivity solution for WAP-enabled mobile phone", Proceedings of the 25th International Conference on Information Technology Interfaces, 2003, ITI 2003, Jun. 16-19, 2003, Cavtat, Croatia, pp. 587-592, ISSN: 1330-1012.
Toshiyuki Mizuyoshi, "Pop is Also as Simple as SMTP and Let's Use it Upon Comprehension of the Problems", Nikkel Open Systems, (68 ed), p. 214-225, Nov. 15, 1998.

* cited by examiner

MAILBOX POOLING PRE-EMPTING CRITERIA

BACKGROUND

1. Technical Field

This application relates in general to wireless communication systems, and more particularly to an improved system and method of updating e-mail messages between a mail server and a mobile communication device or between multiple external mailboxes and main mailbox, using mailbox pooling pre-emptive criteria 2. Description of the Related Art It is known in the art to provide email polling of a central mail server for updating messages between remote users and. For example, Novell® provides a NetMail XE solution whereby a mail server installed at a branch/remote office receives e-mail messages from an Internet Service Provider (ISP), and distributes the received messages to users at the branch/remote office over a local area network. A mail sub-domain at the ISP forwards all e-mail for the remote office to the mail server, which functions as a mail cache, sending e-mail to and receiving e-mail from the ISP.

In the above-described system, the mail sub-domain at the ISP is polled by the mail server to send or receive messages, regardless of whether the mailbox has any new incoming or outgoing messages. In large systems, this polling method may consume large amounts of server resources and impact performance. The consumption of resources and performance impact is more pronounced when mailbox polling occurs on mobile devices over bandwidth-limited wireless networks. For example, if a mail server with 1000 mailboxes is polled and sends updates every 15 minutes to 1000 mail applications running on wireless devices, the wireless network will become severly congested resulting in significant service delays.

In order to address this shortcoming, a new polling method has been proposed for use with mobile communication devices, such as wireless data communicators. This new polling method, referred to as 'adaptive polling' provides mailbox updates based on a trigger event. Adaptive polling automatically determines the polling interval of the user based on his usage profile. A description of adaptive polling is set forth in U.S. Patent Application No. 60/493,118 filed Aug. 7, 2003, the contents of which are incorporated by reference. In this system, a remote wireless subscriber can integrate external mailboxes (e.g. POP accounts) to his/her mobile wireless account via a POP polling engine that periodically polls new e-mails from the external accounts and places new e-mails into the user's mobile wireless account mailbox to be delivered to his/her mobile communication devices. When the polling engine polls an external mailbox, it requests the current list of message IDs from the external mailbox and checks each entry in the list to see if it has already been stored in a local database. If the message ID is not found in the database, it is deemed to be a new e-mail and will be retrieved. Once the new e-mail has been retrieved, the message ID is added to the database so as to prevent subsequent re-retrieval during subsequent polls. If the message ID is found in the database, it is deemed to be an old message and is ignored. The adaptive algorithm varies the polling frequency based on the volume of e-mail traffic that the user is experiencing. However, for each external POP account, the polling engine has to be able to determine if the external account has new e-mails, and which ones are new.

The adaptive polling technique set forth above suffers from performance problems in that every message ID must be checked against the database for every poll. Accordingly, the technique is not efficient for large mailboxes and large numbers of mailboxes.

In the present specification, the term "polling" is used to indicate detecting new messages, retrieving detected new messages and sending the messages to a device or mailbox. Thus, polling differs from synchronization, by which messages on a user device/main mailbox are completely synchronized with messages in the user's mailbox/multiple external mailboxes. Whereas polling may occur with relatively high frequency, full synchronization is performed periodically (at a time interval that is much longer than the polling interval), or in response to a user request via his/her device for full synchronization.

SUMMARY OF THE INVENTION

According to an aspect of the present invention, mailbox pooling pre-emptive criteria are used by the polling engine to determine whether there has been no change to the mailbox (i.e. there are no new e-mails), in which case there is no need to compare the message list against the local database.

More particularly, the polling engine stores an indication of the number of messages in the mailbox, the total mailbox size (used storage size in bytes), and the last message ID from the last poll. In the next poll, the polling engine retrieves this information from the mailbox and checks against the values stored from the last poll. If the information is the same, then there is need to compare the message ID list. Whenever either the number of messages in the mailbox, or the mailbox size (used storage size in bytes), or last message ID has changed, then the full comparision of the message ID list is performed.

Other aspects and features of the present application will become apparent to one of ordinary skill in the art upon reviewing the following description of specific embodiments of the present invention in conjunction with the accompanying figures.

BRIEF DESCRIPTION OF THE DRAWINGS

Embodiments of the present application will now be described, by way of example only, with reference to the attached figures, wherein.

Same reference numerals are used in different figures to denote similar elements.

DETAILED DESCRIPTION OF THE DRAWINGS

Figure 1:
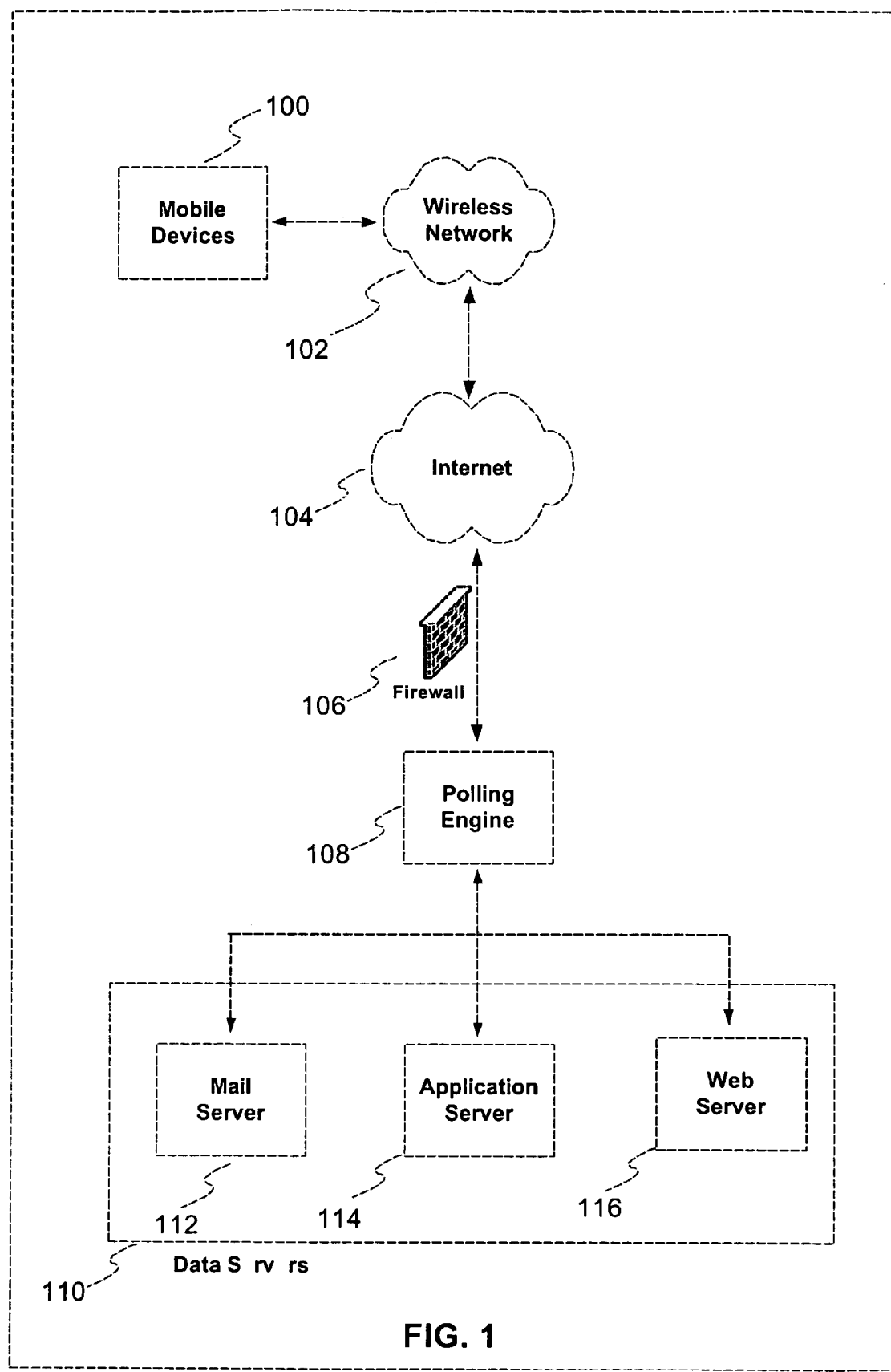
FIG. 1 is a block diagram illustrating a system for adaptive e-mail polling, according to the prior art.

Referring now to the drawings, FIG. 1 is a block diagram illustrating the system for adaptive polling set forth in U.S. Patent Application No. 60/493,118, referred to above. The components of the adaptive polling system consist of a plurality of wireless devices 100 for remote communicating with an enterprise (e.g. corporate office, ISP, etc) over a wireless network 102 and the Internet 104. The enterprise includes a polling engine 108 and a variety of data servers 110 connecting to the polling engine 108, such as a mail server 110, application server 112, web server 114, and other comparable devices.

The polling engine 108 is located behind the corporate firewall 106 of the enterprise, for ensuring secure communication between the mobile device 100 and the data servers 110.

As discussed above, polling engine 108 determines adaptive polling rates based on the usage profile of each user. Although the preferred embodiment is described in terms of polling the mail server 112, it will be understood by a person skilled in the art that the polling engine can also be configured to poll for services and events from other ones of the data servers 110 (e.g. application server 114, web server 116, etc.). Moreover, the principles of the invention my be applied to polling for mail from a plurality of external mailboxes, where the polling engine is disposed between the external mailboxes and a main mailbox, as discussed in greater detail below with reference to FIG. 4.

Returning to FIG. 1, the polling engine 108 initially monitors the default mail-polling interval of the mail server 110. For example, the system may initially be configured to poll all mailboxes once every 15 minutes. As discussed in greater detail below with reference to FIG. 2, the polling engine 108 uses adaptive polling to determine if there has been recent activity in the remote user's mailbox, in which case the polling interval is shortened to increase the frequency of mailbox polling. This increase in polling frequency provides the user with new e-mails in a near real-time fashion.

As discussed above, on each poll the polling engine 108 requests a current list of message IDs from the mail server 112, for storage in an internal database. The polling engine 108 compares the current list to the list of message IDs stored in the database as a result of a previous poll. If any message ID in the current list is not found in the list of previous message IDs stored in the database, it is deemed to be a new e-mail. Synchronization of data then takes place between the mobile device 100 and the mail server 112. For each retrieved e-mail, the message ID is added to the database so as to prevent subsequent re-retrieval during the next poll. If a message ID in the current list is found in the database, it is deemed to be an old message and is ignored (i.e. the database remains unchanged and no synchronization takes place).

Figure 2:
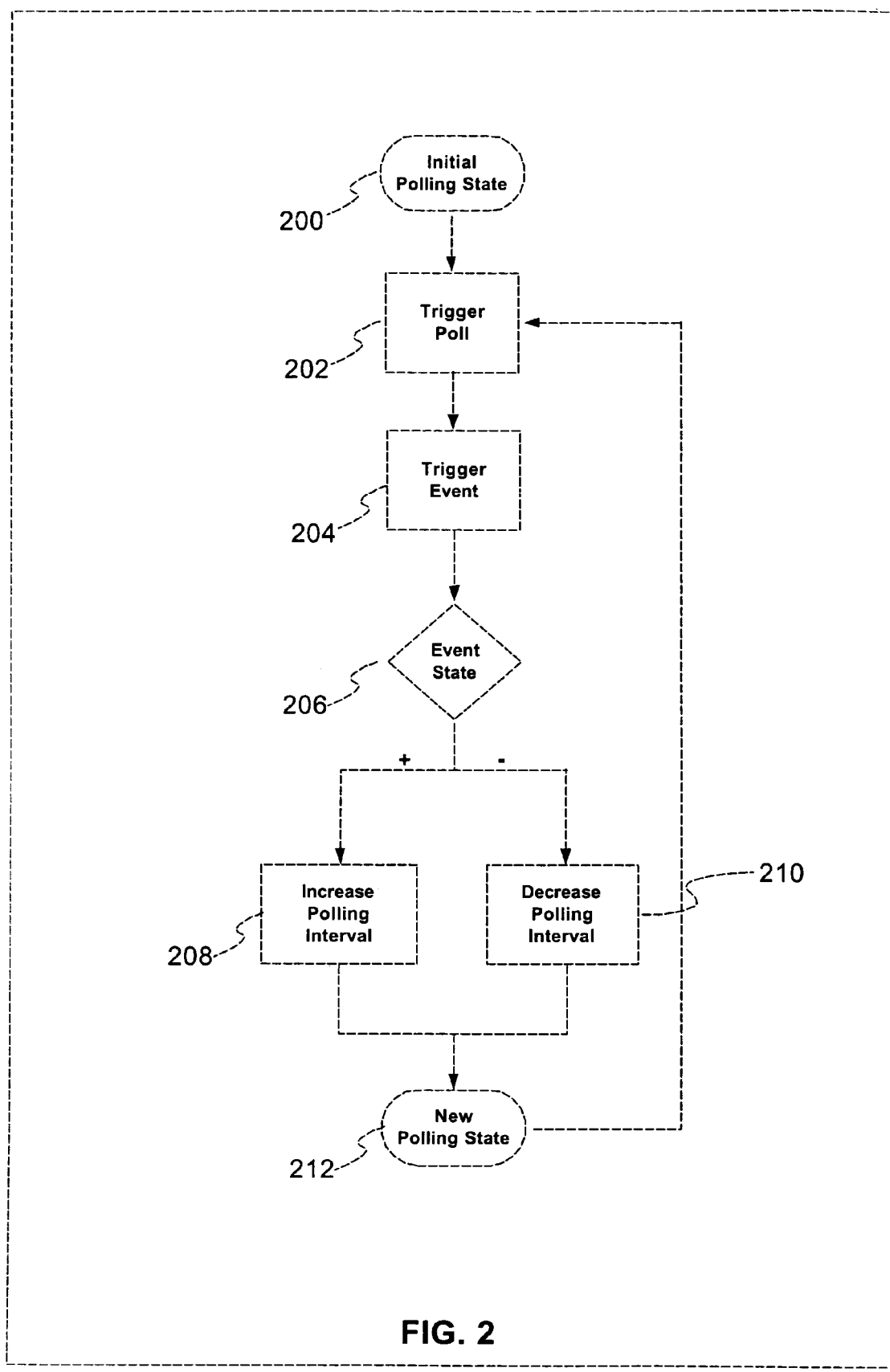
FIG. 2 is a flow diagram illustrating an adaptive polling decision path for the system of FIG. 1.

FIG. 2 is a flow diagram illustrating an adaptive polling decision path according to U.S. Patent Application No. 60/493,118, filed Aug. 7, 2003. The process starts with the polling engine 108 functioning in its initial polling state 200 (i.e., the default polling interval). The polling engine 108 triggers a poll 202 to the mail server 112 (or other data server 110), which checks for incoming and outgoing mail. The poll 202 may be triggered internally as a result of the default polling interval previously established, or externally as a result of the user checking for mail at his/her mobile device 100. The details of the poll are set forth above (i.e. the polling engine retrieves and compares the current list of message IDs with the list previously stored in the database, etc.) The result of the poll 202 then triggers an event 204 that is classified as either positive or negative 206. Alternatively, in the event that the poll is triggered as a result of the user checking messages on his/her mobile device, a positive event state occurs. A positive event increases the polling interval 208 and a negative event decreases the polling interval 210. Once the event is determined, the system henceforth operates in its new polling state 212. If there is further activity, a new poll is triggered 202 and the process flow repeats itself.

Examples of positive events include a new message arriving in the mailbox, the user checking messages on the mobile device, etc. Examples of negative events include an invalid login or password confirmation to connect to the mailbox at the mail server 112, the mobile device being out of wireless coverage range, failure of an attempt to deliver mail to the mobile device, etc.

Based on the positive or negative event 206, the polling engine 108 either increases or decreases the polling rate. If the polling engine experiences several successive negative events, the polling interval will be significantly lengthened and will poll the mail server 112 less frequently, resulting in less data sent wirelessly over that polling interval. Once a positive event is received, the polling interval increases again.

A consequence of the system is that the user may perceive better performance in the sense that e-mail messages may seem to arrive more quickly at the mobile device. For example, if the default polling interval is once every 15 minutes and the user receives frequent new messages (i.e. successive positive events), the polling engine 108 may decrease the polling interval to once every 1 or 2 minutes. With this increased polling rate, messages arrive more quickly at the user's mobile device 100, thereby providing a perception of better and faster performance.

Based on the specific users and their usage patterns, U.S. Patent Application No. 60/493,118, discloses a module for the polling engine 108 that can adapt to a user's usage pattern, based on the time of day, day of the week, and heuristic comparison of previous usage activities at that time. The module learns the user's routine and automatically configures the polling interval for polls to the user's mobile device. For example, a busy user can have the polling engine 108 set a positive event (increased polling) first thing in the morning to download all of his incoming messages, another positive event before he leaves for the end of the day, and set negative events (decreased polling) after work until sunrise.

Figure 3:
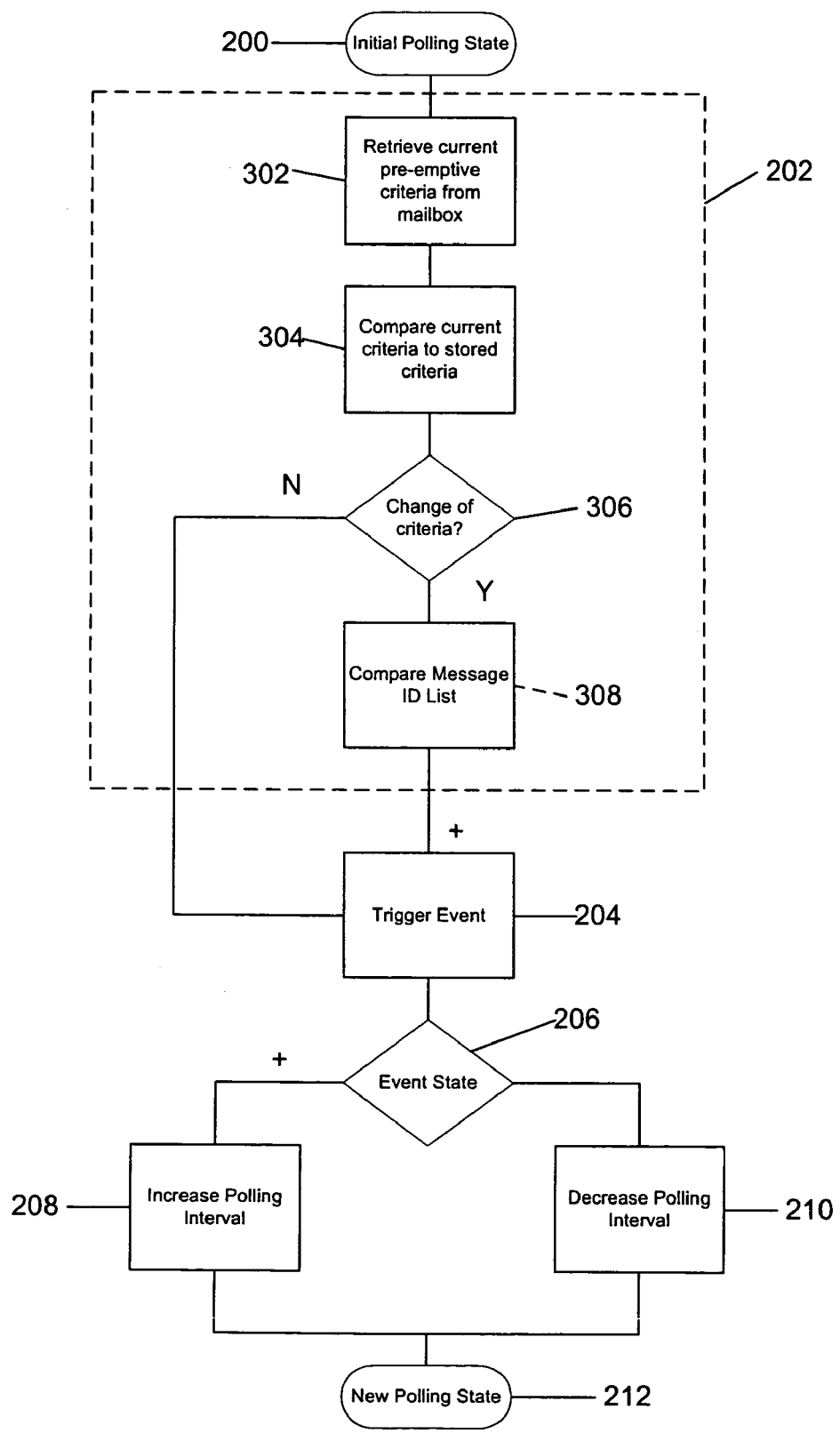
FIG. 3 is a flow diagram illustrating a modification of the adaptive polling decision path of FIG. 2 incorporating mailbox pooling pre-emptive criteria, according to an aspect of the present invention.

Turning now to FIG. 3, a modification is shown to the poll 202 of the adaptive polling decision path of FIG. 2 to include mailbox pooling pre-emptive criteria, according to an aspect of the present invention.

In order to further reduce network congestion and improve remote mailbox polling performance, the polling engine 108 determines, during the poll 202, if there has been any change of state in the mailbox (i.e. no new e-mails). This information is then used as pre-emptive criteria to prevent unnecessary retrieval of the message list and comparison thereof against the local database.

During the poll 202, polling engine 108 stores values in the local database representing pre-emptive criteria, such as the number of messages in the mailbox, the total mailbox size, and the last message ID. The "total mailbox size" criteria is the total size (in bytes) of messages in the mailbox (also referred to in the art as "mailbox used quota"). In the next poll, at 302, the polling engine 108 ascertains the current pre-emptive criteria (e.g. current number of messages in the mailbox, current total mailbox size, and last message ID), and at 304 compares these current values against the values previously stored in the local database. If these criteria are the same, then there is no need to compare the message ID list (i.e. a "no" decision at 306). However, whenever there has been a change in any one of the pre-emptive criteria (i.e. a "yes" decision at 306), then the comparision of message ID list is performed 308.

It should be noted that it is not necessary for all three criteria to be used for detecting new mails. Depending on the availability of these criteria from the mail server 112 (mail protocol—e.g. POP, IMAP, etc.), only one, or two of the criteria may be used. However, the use of more criteria results in better precision in the determination that the mailbox has no mail (i.e. all criteria remain unchanged).

Also, whereas the embodiments discussed with reference to FIG. 1 to FIG. 3, relate to polling of a user's mailbox in mail server 112 for updating of emails with remote device 100, the principles of the invention may be extended to synchronization between a mailbox in a mail server and a mail client, or to retrieiving new mail (i.e. not full synchronization) and forwarding or sending the new mail to another mailbox or service.

For example, a user's external mailbox(es) POP server(s) can be integrated with his/her main mailbox provided by the user's ISP, to consolidate the different external mailboxes into one single mailbox and thereby simplify managing and checking of emails from the different mailboxes. In this embodiment, the service provider incorporates polling engine 108 to poll the external mailboxes and forward (e.g. send) the retrieved new messages to the customer's main mailboxes.

Figure 4:
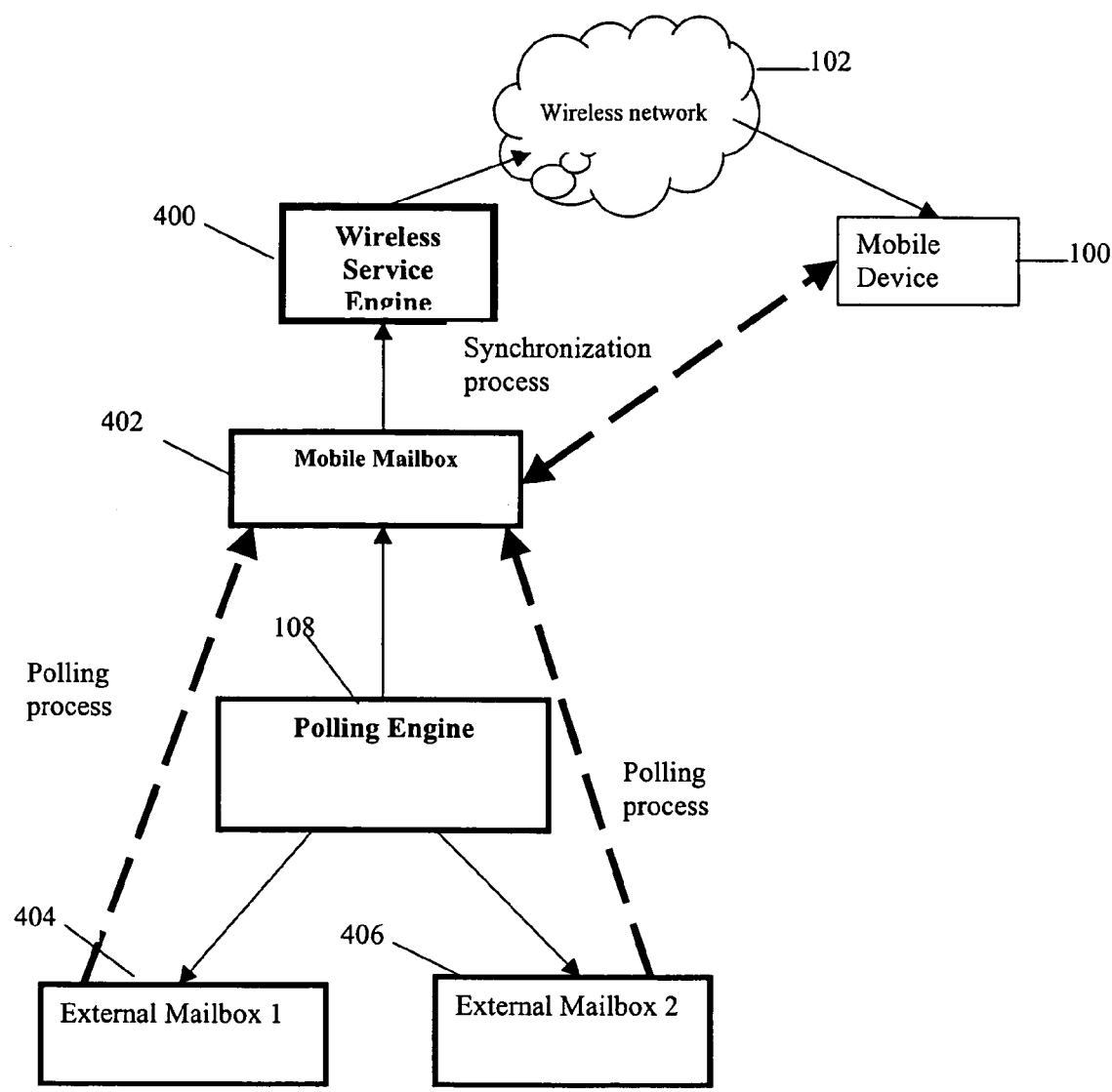
FIG. 4 is a block diagram illustrating a system for adaptive e-mail polling with mailbox pooling pre-emptive criteria, according to an alternative embodiment of the invention.

According to the embodiment of FIG. 4, each user of a mobile device 100 is provided with a mobile mailbox that is accessible via a wireless service engine 400 over the wireless network 102. As discussed above, it is possible for a user to integrate multiple external mailbox accounts 404, 406, etc. (e.g. POP, AOL, Hotmail, Yahoo, etc.) to their main account 402, by providing the service engine 400 with appropriate logins and passwords to access the external mailboxes. With the polling engine 108 disposed between the main mailbox 402 and the external mailboxes 404, 406, etc., as soon as new e-mails from the external mailboxes are polled and sent/forwarded to the user's main mailbox 402, the messages are treated as "new e-mails" within the mailbox 402 and are immediately "push" to the user's mobile device 100. In this case, the pre-emptive criteria are used in the polling engine 108 to regulate polling of the external mailboxes 404, 406, etc. Synchronization between the user's main mailbox 402 and the user's mobile device 100 is performed by the wireless service engine 400.

The above-described embodiments of the present application are intended to be examples only. Those of skill in the art may effect alterations, modifications and variations to the particular embodiments. For example, although the preferred embodiment is set forth as an improvement to the adaptive polling method shown in FIG. 2, it is contemplated that the method of employing pre-emptive criteria set forth above may be implemented without any trigger event 204, determination of event state 206 or change in polling interval 208/210. In this variation, the default polling interval and/or user initiated message send/receive are used to trigger the poll 202 following which the user device or mailbox is updated (i.e. a "yes" decision at 306) or pre-empted (i.e. a "no" decision at 306), without modifying the polling interval. Even without modification of the polling interval, this variation results in improved performance by eliminating unnecessary polling.

All such modifications and variations are possible without departing from the scope of the invention as defined by the claims appended hereto.

What is claimed is:

1. In an adaptive polling method for updating e-mails between at lease one mail server and a mobile communication device or mobile mail box of such device, the improvement comprising: retrieving current pre-emptive criteria from said at least one mail server; comparing said current pre-emptive criteria to previously stored pre-emptive criteria; and in the event said current pre-emptive criteria do not equal said previously store pre-emptive criteria then updating said e-mails between said at lease one mail server and mobile communication device or mobile mailbox, and otherwise pre-empting said updating of said e-mails between said at least one mail server and mobile communication device or mobile mailbox; wherein said pre-emptive criteria comprise at least one of number of messages in said mailbox and size said mailbox, and wherein the polling method is adapted for updating e-mails between multiple external mail servers and the mobile mailbox of the mobile device; the retrieving step comprises retrieving current pre-emptive criteria from each of said multiple external mail servers; and the comparison step comprises comparing said current pre-emptive criteria to previously stored pre-emptive criteria for respective ones of said multiple external servers; in the event said current pre-emptive criteria do not equal said previously stored pre-emptive criteria for a respective one of said multiple external mail severs then updating said e-mails between said respective one of said multiple external mail servers and said mobile mailbox, or otherwise pre-empting said updating of said e-mails between said respective one of said multiple external mail servers and said moble mailbox; and wherein said pre-emptive criteria comprise at least one of number of messages in and size of the mailbox of a respective one of said multiple external mail servers.

2. A wireless communication system comprising: a mobile device accessible via a wireless network; and a polling engine arranged to update e-mails between at least one mail sever and at least one of the mobile device and a mobile mailbox of the mobile device, the polling device being capable of communicating with said at least one of the mobile device and mobile mailbox and arranged to retrieve current pre-emptive criteria from said at least one mail sever and compare said current pre-emptive criteria to previously stored pre-emptive criteria, and being further arranged to update said e-mails between said at least mail sever and said least one of The mobile device and mobile mailbox in the event said current pre-emptive criteria do not equal said previously store pre-emptive criteria or to otherwise pre-emptive said updating of said email between said at lease one mail server and said at least one of the mobile device and mailbox, wherein said pre-emptive criteria comprise at lease one of number of messages in and size of said mailbox, and wherein said polling engine is arranged to update e-mails between multiple external mail servers and the mobile mailbox of the mobile device; the polling engine being arranged to retrieve current pre-emptive criteria from each of said multiple external mail servers, compare said current pre-emptive criteria to previously stored pre-emptive criteria for respective ones of said multiple external mail servers, and update said e-mails between said respective one of said multiple external mail servers and said mobile mailbox in the event said current pre-emptive criteria do not equal said previously stored pre-emptive criteria for a respective one of said multiple external mail servers, or to otherwise pre-empt said updating of said e-mails between said respective one of sad multiple external mail servers and said mobile mailbox; wherein said pre-emptive criteria comprise at least one of number of messages in and size of the mailbox of a respective one of said multiple external mail servers.

3. The wireless communication system of claim 2, including a wireless service engine for controlling data communication over said wireless network between said mobile device and said mobile mailbox.

* * * * *